(12) United States Patent
Al-Shaikhi et al.

(10) Patent No.: US 9,623,564 B2
(45) Date of Patent: Apr. 18, 2017

(54) TARGET-SEEKING CONTROL METHOD AND SYSTEM FOR MOBILE ROBOTS

(71) Applicant: KING FAHD UNIVERSITY OF PETROLEUM AND MINERALS, Dhahran (SA)

(72) Inventors: Ali Ahmad Al-Shaikhi, Dhahran (SA); Mohanad Ahmed Mohamed Elhassan, Dhahran (SA); Ahmed A. Masoud, Dhahrad (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 11 days.

(21) Appl. No.: 14/641,245

(22) Filed: Mar. 6, 2015

(65) Prior Publication Data
US 2016/0257004 A1  Sep. 8, 2016

(51) Int. Cl.
*B25J 9/16* (2006.01)
*B25J 5/00* (2006.01)

(52) U.S. Cl.
CPC ........... *B25J 9/1694* (2013.01); *B25J 9/1607* (2013.01); *B25J 9/1628* (2013.01); *B25J 9/1674* (2013.01); *B25J 9/1676* (2013.01); *Y10S 901/01* (2013.01)

(58) Field of Classification Search
CPC ........ B25J 9/1694; B25J 9/163; B25J 9/1664; B25J 9/1666; B25J 9/1674; B25J 9/1676; B25J 9/1684; G05D 1/0274; G05D 1/0212; G05D 1/0214; G05D 1/0238; G05D 1/0255; G05D 1/0257; G05D 1/0259

See application file for complete search history.

(56) References Cited

U.S. PATENT DOCUMENTS

| 5,758,298 A | 5/1998 | Guldner |
| 2006/0293792 A1 | 12/2006 | Hasegawa |

OTHER PUBLICATIONS

E. Prestes, M. A. P. Idiart, P. M. Engel and M. Trevisan, "Exploration technique using potential fields calculated from relaxation methods," Intelligent Robots and Systems, 2001. Proceedings. 2001 IEEE/RSJ International Conference on, Maui, HI, 2001, pp. 2012-2017 vol. 4.*

Gupta et al., "A network based, delay-tolerant, integrated navigation system for a differential drive UGV using harmonic potential field", Decision and Control, 2006 45th IEEE Conference on. IEEE, 2006.

(Continued)

*Primary Examiner* — Adam Mott
(74) *Attorney, Agent, or Firm* — Richard C. Litman

(57) ABSTRACT

The target-seeking control method and system for mobile robots uses a raw, ultrasonic sensory signal. The present method carries-out reasoning and decision-making in a subjective environment (SE) on-board the robot. This environment has only two links to the objective environment (OE) in which the robot is operating. If the robot is at a safe place in a SE, then it is at a safe place in the corresponding OE. If the robot reaches the target in a SE, then it reaches the target in the corresponding OE, The present method uses relaxed potential fields to base enroute mobility on safety, only without having to accurately estimate the geometry of the surrounding environment, thereby significantly reducing structure complexity and increasing its reliability.

3 Claims, 16 Drawing Sheets

(56) References Cited

OTHER PUBLICATIONS

Gupta et al., "A delay-tolerant potential-field-based network implementation of an integrated navigation system", Industrial Electronics, IEEE Transactions on 57.2 (2010): 769-783.
Habib, Maki K., and K. Maki. "Real time mapping and dynamic navigation for mobile robots", International journal of advanced robotic systems 4.3 (2007): 323-338.
Masoud, Ahmad A. "A discrete harmonic potential approach to motion planning on a weighted graph", American Control Conference, 2008. IEEE, 2008.
Masoud, Ahmad A., and Samer A. Masoud. "Evolutionary action maps for navigating a robot in an unknown, multidimensional, stationary environment. II. Implementation and results", Robotics and Automation, 1997. Proceedings., 1997 IEEE International Conference on. vol. 3. IEEE, 1997.
Silva Jr. et al., "Exploration Method Using Harmonic Functions", Robotics and Autonomous Systems, 40, 25-42, 2002.
Spenko, Matthew, et al. "Hazard avoidance for high-speed mobile robots in rough terrain." Journal of Field Robotics 23.5 (2006): 311-331.
Thorpe, "Path relaxation: Path planning for a mobile robot", OCEANS 1984. IEEE, 1984.

* cited by examiner

TARGET-SEEKING CONTROL METHOD AND SYSTEM FOR MOBILE ROBOTS

BACKGROUND OF THE INVENTION

1. Field of the Invention

The present invention relates to robotics, and particularly to a target-seeking control method and system for mobile robots using relaxed field techniques to successfully guide the robot in known and unknown environments.

2. Description of the Related Art

Mobile robots have become indispensable in modern life activities. A considerable part of mobile robot activities involves operations in structured, predictable, even known environments (factory floors, warehouses, etc.). However, many applications require the robot to operate in unstructured and unknown environments. In extreme cases, such as first response in disaster areas, a mobile robot is required to provide informational access to the crew by going to the troubled spot in an unstructured and unknown environment as soon as possible. In such cases, the timely information the robot provides is probably more valuable than the robot itself.

This is a challenging problem, since all techniques designed for practical autonomous robots in unknown environments require an exploration and map-building stage before a robot can actually move to the required target zone. In a time-critical task, mandating a map-building stage in the manner an autonomous robot is required to function is self-defeating. Also, existing approaches designed for unknown environments require the robot to be equipped with a variety of expensive sensing capacities (e.g., laser scanners, omnidirectional cameras, etc.). This is highly undesirable in situations where the probability of retrieving the robot is low. Ultrasonic sensors are probably the most suitable choice, cost-wise, for such situations. However, there is a widespread belief in the area of autonomous robotics that ultrasonic signals are not useful for navigating robots in random unstructured environments with scattered irregular obstacles.

Thus, a target-seeking control method and system for mobile robots solving the aforementioned problems is desired.

SUMMARY OF THE INVENTION

The target-seeking control method and system for mobile robots uses a raw, ultrasonic sensory signal. The present method carries out reasoning and decision-making in a subjective environment (SE) on-board the robot. This environment has only two links to the objective environment (OE) in which the robot is operating. If the robot is at a safe place in a SE, then it is at a safe place in the OE. If the robot reaches the target in a SE, then it reaches the target in the OE. The present method uses relaxed potential fields to base enroute mobility on safety, only without having to accurately estimate the geometry of the surrounding environment, thereby significantly reducing structure complexity and increasing its reliability.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 6:
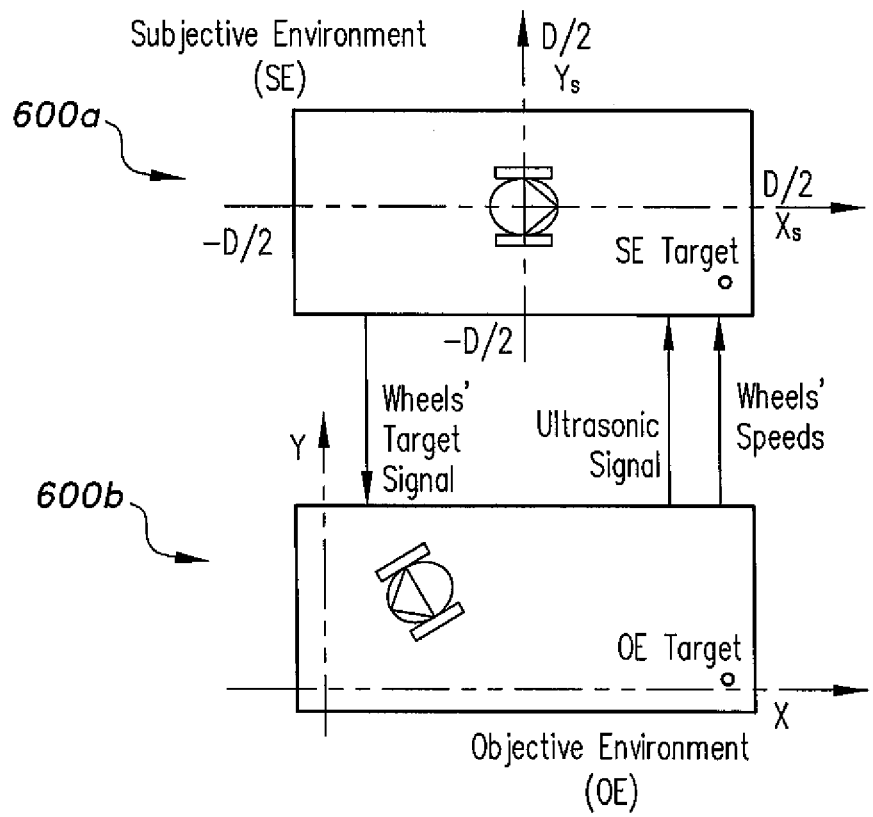
FIG. 6 is a block diagram showing the relationship between the subjective environment (SE) and the objective environment (OE) of the mobile platform used by the target-seeking control method and system for mobile robots according to the present invention.

The target-seeking control method for mobile robots uses a raw, ultrasonic sensory signal. The present method carries out reasoning and decision-making in a subjective environment (SE) 600a (shown in FIG. 6) on-board the robot. This environment has only two links to the objective environment (OE) 600b in which the robot is operating. Link 1 provides that if the robot is at a safe place in a SE, then it is at a safe place in the corresponding OE. Link 2 provides that if the robot reaches the target in a SE, then it reaches the target in the corresponding OE.

The present method uses relaxed potential fields to base enroute mobility on safety, only without having to accurately estimate the geometry of the surrounding environment, thereby significantly reducing structure complexity and increasing its reliability.

Figure 3:
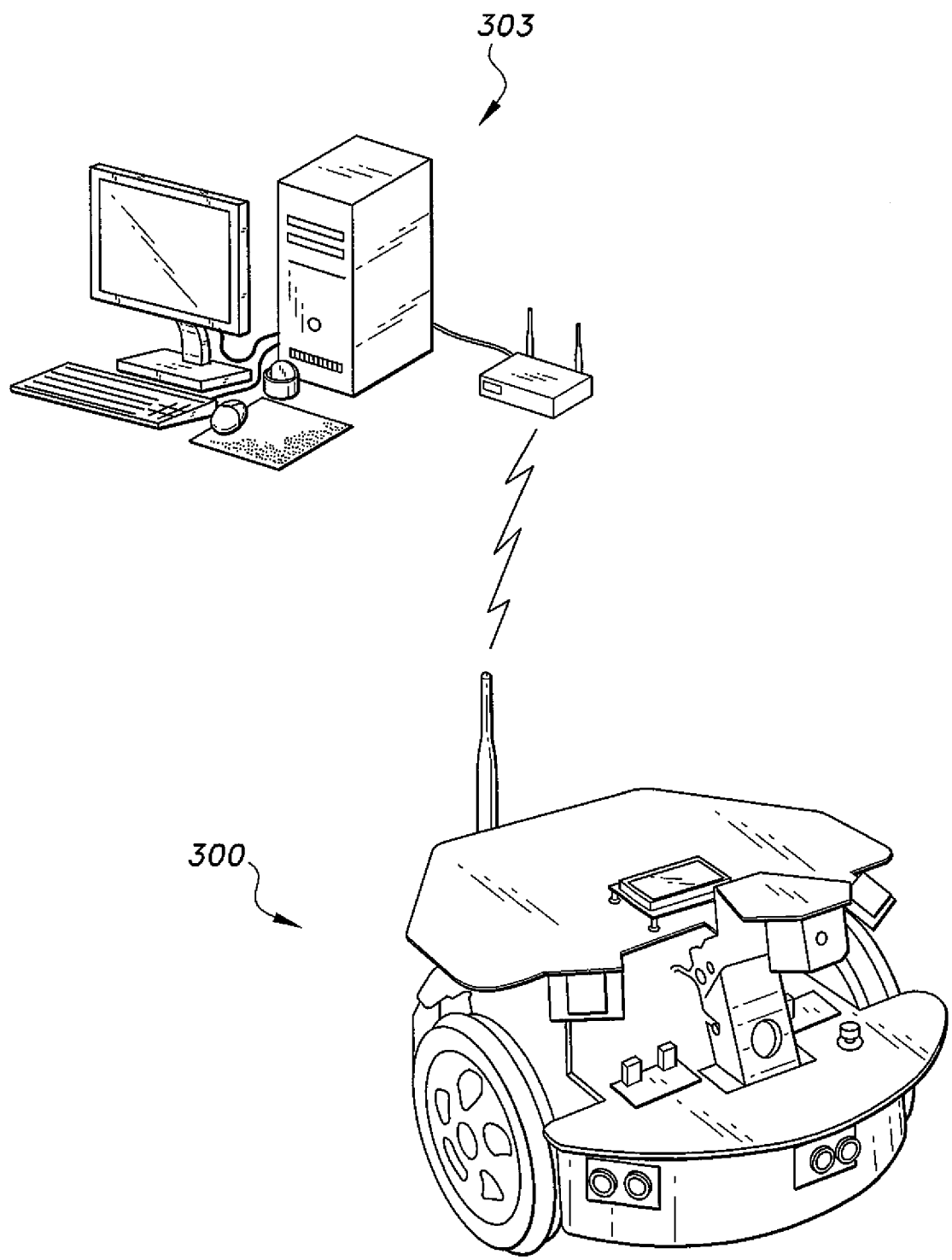
FIG. 3 is a perspective view of the mobile platform used in the target-seeking control method and system for mobile robots according to the present invention.
Figure 5:
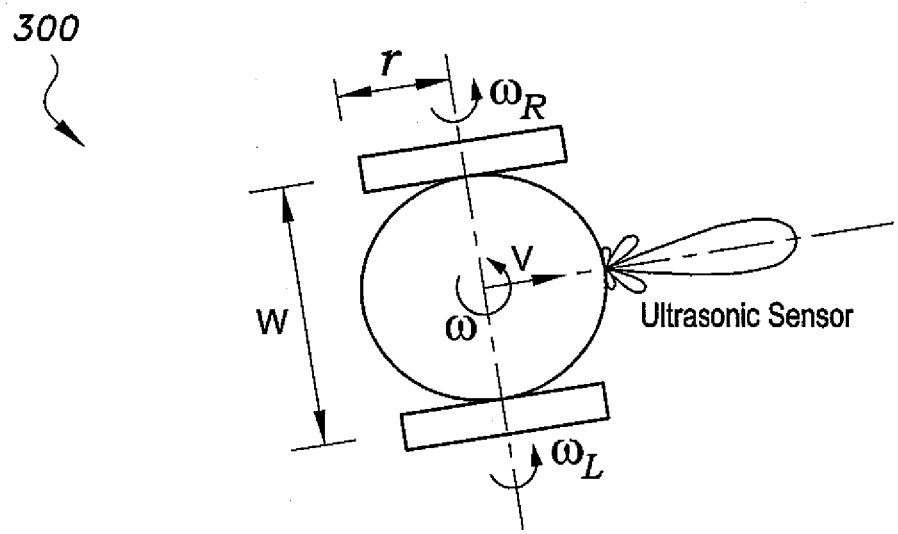
FIG. 5 is a top plan view showing the differential drive robot used in the target-seeking control method and system for mobile robots according to the present invention.

While the use of scalar potential fields to aid robotic navigation is known in the art, the present target-seeking control method utilizes full and partial field relaxation procedures to relax the potential fields, thereby improving robotic navigation performance in both known and unknown environments. Typical motion equations of a velocity-controlled differential drive robot, such as the robot 300 shown in FIGS. 3 and 5, are:

$$\begin{bmatrix} \dot{X}_S \\ \dot{Y}_S \\ \dot{\theta}_S \end{bmatrix} = \begin{bmatrix} \cos(\theta_S) & 0 \\ \sin(\theta_S) & 0 \\ 0 & 1 \end{bmatrix} \begin{bmatrix} v \\ \omega \end{bmatrix} \begin{bmatrix} v \\ \omega \end{bmatrix} = \begin{bmatrix} \frac{r}{2} & \frac{r}{2} \\ \frac{r}{W} & \frac{-r}{W} \end{bmatrix} \begin{bmatrix} \omega_R \\ \omega_L \end{bmatrix} \quad (1)$$

$$\begin{bmatrix} \omega_R \\ \omega_L \end{bmatrix} = \begin{bmatrix} \frac{1}{r} & \frac{W}{2r} \\ \frac{1}{r} & \frac{-W}{2r} \end{bmatrix} \begin{bmatrix} v \\ \omega \end{bmatrix}.$$

The exemplary robot 300 is an X80 Pro manufactured by Dr Robot™ (Dr. Robot is a registered trademark of Dr. Robot, Inc. of Ontario, Canada). It has a distributed computation robotic architecture that enables high-level control of the robot to be maintained by a remote or local PC/server, such as exemplary computer 303, communicating by a secure wireless link, e.g., WIFI. Low-level functionality of the robot 300 is managed by an onboard digital signal processor (DSP), while computationally intensive operations are performed outboard by the exemplary computer 303.

Figure 1:
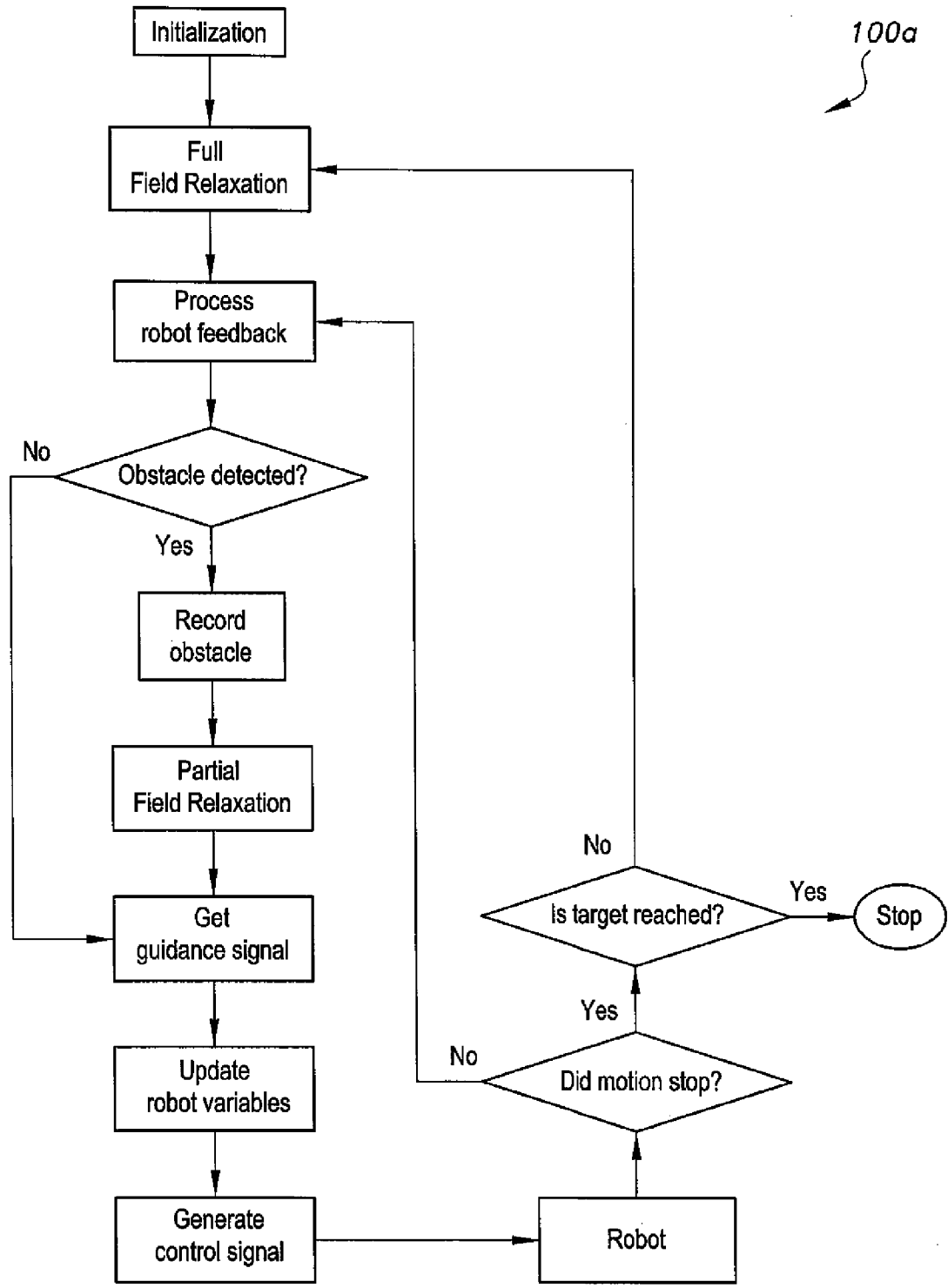
FIG. 1 is a flowchart showing ultrasonic navigation control structure in a target-seeking control method for mobile robots according to the present invention.
Figure 4:
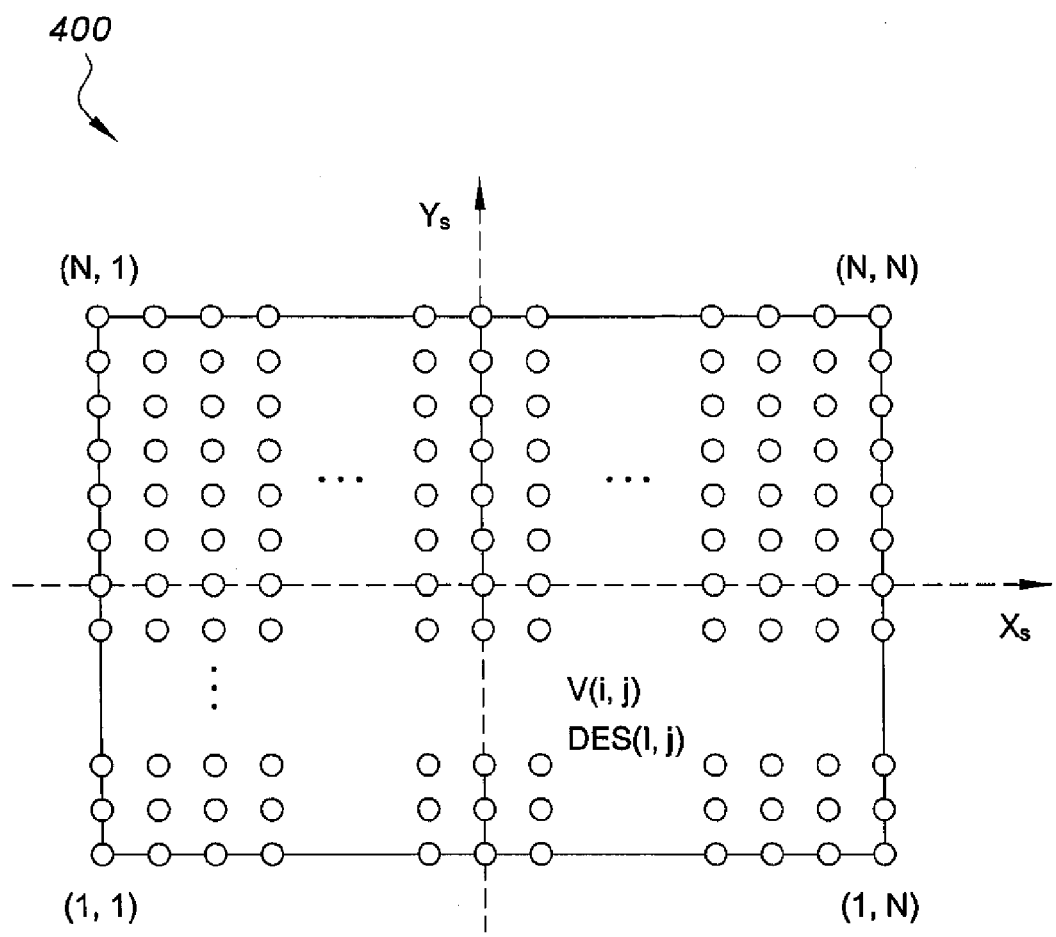
FIG. 4 is a plot showing discretized descriptors in a SE (subjective environment) in a target-seeking control method for mobile robots according to the present invention.

The control signals ($\omega cR$, $\omega cL$) that are fed to the controller of the robot are generated by the control structure 100a, whose flowchart is shown in FIG. 1 and described in Table 10. As shown in FIG. 4, SE discrete descriptors V(ij) and DSE(Ij) 400 describe the unsafe regions DSE and generate the guidance signal V. All variables are defined in the glossary, below.

In order to employ the relaxed potential fields, the present target-seeking control method performs an initialization stage. The glossary of symbols and abbreviations is provided in Table 1. The initialization stage is described in Table 2.

TABLE 1

Glossary of Symbols and Abbreviations

| Symbol | Definition |
|---|---|
| OE | Objective environment in which the robot physically exists |
| SE | Subjective environment created by the sensory signal and used to synthesize the motion of the robot |
| X, Y | Coordinates of the OE (world coordinates) |
| Xs, Ys | Coordinates of the SE |
| $\Theta$s | Robot orientation in SE with respect to Xs |
| XT, YT | Coordinates of the target in OE |
| XTs, YTs | Coordinates of the target in SE |
| DSE(I, j) | Matrix with N × N elements representing the discrete SE |
| V(I, j) | Matrix with N × N elements containing scalar potential field |
| N | The width of DSE in samples |
| Its, JTs | Target discrete coordinates in SE |
| D | Physical dimensions of SE which determines the perimeter of operation of the robot |
| $\Delta$ | Discretization step of SE |
| S | Obstacle distance reading from ultrasonic sensor |
| Sm | maximum range of the ultrasonic sensor |
| Io, Jo | Obstacle location in DSE that is mapped from the ultrasonic sensor reading |
| Im | Margin of safety in discrete location surrounding Io, Jo (Im ≤ 2) |
| Ir | Local relaxation zone in DSE (Ir ≥ 7) |
| L | Number of iteration used for relaxation |
| $\Delta$T | Discrete time step |
| v | Tangential speed of the robot |
| $\omega$ | Angular speed of the robot |
| vd | Desired tangential speed of the robot |
| $\omega$d | Desired angular speed of the robot |
| $\omega$R, $\omega$L | Right and left angular speeds of the robot's wheels |
| $\omega$cR, $\omega$cL | Right and left signals to control the angular speeds of the robot's wheels |
| Gx, Gy | X & Y components of the unit magnitude guidance vector in SE |
| [Z] | The rounding function. It converts the number Z into its nearest integer |
| W | Robot width (distance between the wheels of the robot) |
| r | Radius of the robot's wheels |
| $\delta$ | A small positive number ($|\delta| \ll 1$) |

TABLE 1-continued

Glossary of Symbols and Abbreviations

| Symbol | Definition |
|---|---|
| Rc | Radius of a circle surrounding target. Only the target exist inside the circle (no obstacles present) |

TABLE 2

Steps of the Initialization Stage

| INIT STEP | Function |
|---|---|
| 1 | Supply the target point in SE (XTs, YTs) that corresponds to the target in OE (XTs, YTs) which you want the robot to go to |
| 2 | Supply D and the resolution $\Delta$. Compute N=[D/ $\Delta$] |
| 3 | Compute ITs=[N/2] + [XTs/ $\Delta$], JTs=[N/2]+[YTs/ $\Delta$] |
| 4 | Set Xs=0, Ys=0, $\theta$s=0 |
| 5 | Set $\omega$cR=0, $\omega$cL=0, |
| 6 | Set desired tangential and angular speeds of the robot vd, $\omega$d |
| 7 | Set a value of L. Any value will do; however a practical value of L should be determined based on the value of N |
| 8 | Set a safety margin Im; a value 2 or less is sufficient. Set a local relaxation zone Ir; a value of 11 or higher is sufficient |
| 9 | Initialize DSE as follows:<br>a. First set all values in DSE to ½<br>b. Set DSE(ITs, JTs) = 0<br>c. For all values of i setDSE(i, N) = 1, DSE(i, 1) = 1<br>DSE(N, i) = 1,<br>DSE(1, i) = 1 |
| 10 | Set V(i,j) = DSE(i,j) for all values of i and j |

The full field relaxation stage is described in Table 3.

TABLE 3

Steps of the Full Field Relaxation Stage

| FFR STEP | Function |
|---|---|
| 1 | K=1 |
| 2 | Loop until K=L |
| 3 | For i=2 to N-1, |
| 4 | For j=2 to N-1 |
| 5 | IF DSE(i,j) equal ½, V(i, j) = ¼(V(i − 1, j) + V(i + 1, j) + V(i, j − 1) + V(i, j+)), end |
| 6 | End |
| 7 | End |
| 8 | K=K+1 |

The process robot feedback stage is described in Table 4.

TABLE 4

Steps of the Process Robot Feedback Stage

| PRF STEP | Function |
|---|---|
| 1 | Read robot wheel speeds: $\omega$R, $\omega$L |
| 2 | Compute tangential and angular speeds of robot $\begin{bmatrix} v \\ \omega \end{bmatrix} = r \cdot \begin{bmatrix} \frac{1}{2} & \frac{1}{2} \\ \frac{1}{W} & -\frac{1}{W} \end{bmatrix} \begin{bmatrix} \omega R \\ \omega L \end{bmatrix}$ |

TABLE 4-continued

Steps of the Process Robot Feedback Stage

| PRF STEP | Function |
|---|---|
| 3 | If S > Sm then no obstacle is detected by sensor; else the sensor detected an obstacle |

The record obstacle stage is described in Table 5.

TABLE 5

Steps of the Record Obstacle Stage

| RO STEP | Function |
|---|---|
| 1 | $Io = \left[\frac{Xs + S \cdot \cos(\theta s + \delta)}{\Delta}\right], Jo = \left[\frac{Xs + S \cdot \sin(\theta s + \delta)}{\Delta}\right]$ |
| 2 | for i=Io−Im to Io+Im<br>for j=Jo−Im to Jo+Im<br>If 2≤i≤N−1 and 2≤j≤N−1 and DSE(I,j)≠0, DSE(I,j)=1, end<br>end<br>end |

The partial field relaxation stage is described in Table 6.

TABLE 6

Steps of the Partial Field Relaxation Stage

| PFR STEP | Function |
|---|---|
| 1 | K=1 |
| 2 | Loop until K=L |
| 3 | For i=Io−Ir to Io+Ir |
| 4 | For j=Jo−Ir to Jo+Ir |
| 5 | If 2≤ i ≤N−1 and 2≤ j ≤N−1 |
| 6 | If DSE(i,j) equal ½, V(i, j) = ¼(V(i − 1, j) + V(i + 1, j) + V(i, j − 1) + V(i, j+)), end |
| 7 | end |
| 8 | end |
| 9 | end |
| 10 | K=K+1 |

Full domain relaxation may be used after the above stage at highly reduced number of iterations L1<<L (e.g. if L=2000, L1=200).

The get guidance signal stage is described in Table 7.

TABLE 7

Steps of the Get Guidance Signal Stage

| GGS STEP | Function |
|---|---|
| 1 | $i = \left[\frac{N}{2}\right] + \left[\frac{Xs}{\Delta}\right], j = \left[\frac{N}{2}\right] + \left[\frac{Ys}{\Delta}\right]$ |

TABLE 7-continued

Steps of the Get Guidance Signal Stage

| GGS STEP | Function |
|---|---|
| 2 | Gx = −(V(i + 1, j) − 2V(i, j) + V(i − 1, j)), Gy = −(V(i, j + 1) − 2V(i, j) + V(i, j − 1)) |
| 3 | C = $\sqrt{Gx^2 + Gy^2}$ |
| 4 | Gx = Gx/C, Gy = Gy/C |

The update robot variables stage is described in Table 8.

TABLE 8

Steps of the Update Robot Variables Stage

| URV STEP | Function |
|---|---|
| 1 | vx = v · cos(θs), vy = v · sin(θs) |
| 2 | Xs = Xs + ΔT · vx, Ys = Ys + ΔT · vy |
| 3 | θs = θs + ΔT · ω |

Figure 2:
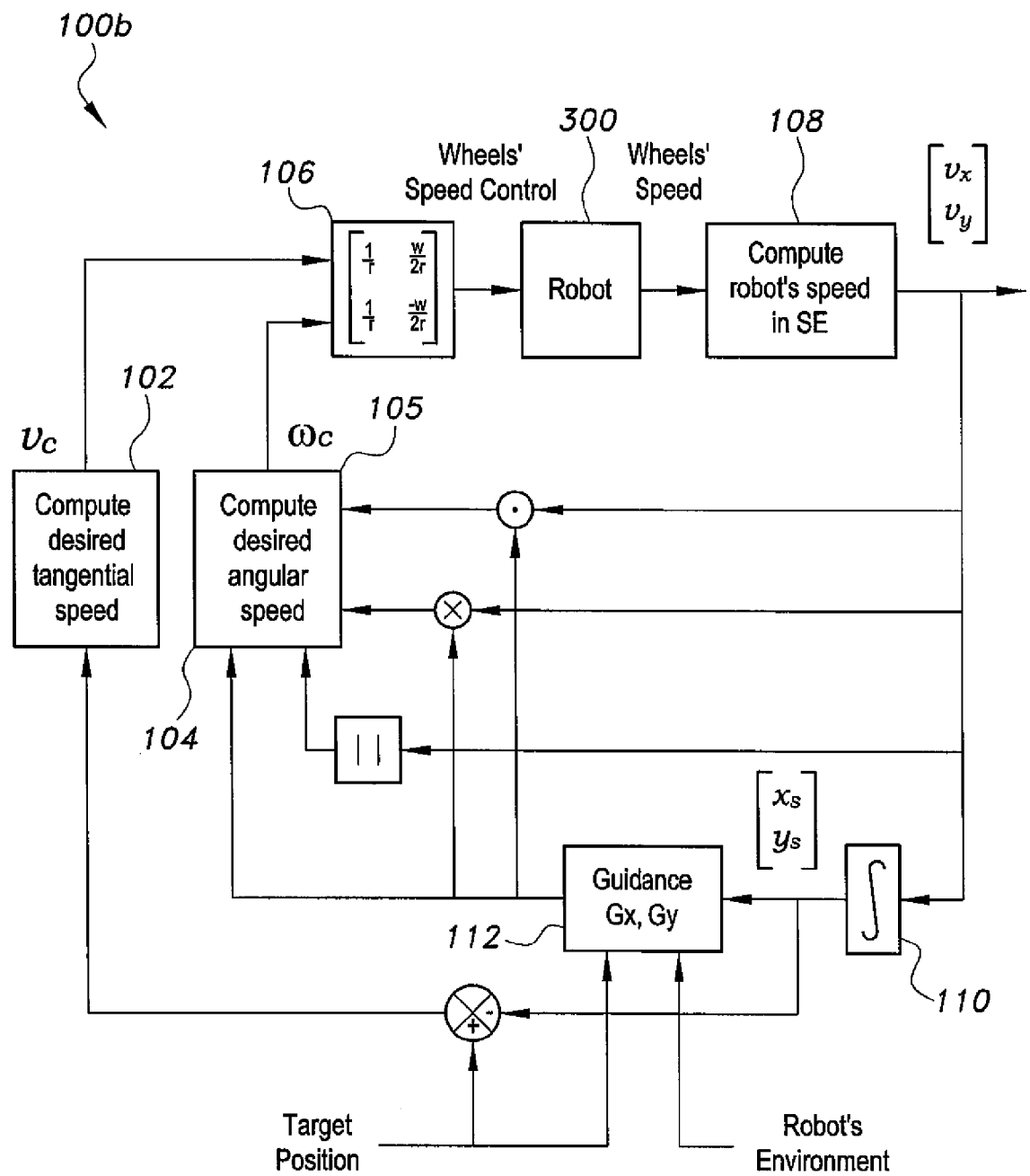
FIG. 2 is a block diagram showing control signal generation from the guidance signal in a target-seeking control method and system for mobile robots according to the present invention.

The generate control signal (GCS) stage is described in Table 9. The GCS system 100b is shown in FIG. 2. Tangential speed computation block 102 includes a tangential speed computation input and a tangential speed command output, $v_c$. The desired angular speed computation block 105 includes desired angular speed computation inputs and a desired angular speed output, ωc. A wheel speed control block 106 is connected to the tangential speed computation block 102 and the desired angular speed computation block 105, the wheel speed control block accepting as inputs the tangential speed command, $v_c$ and the desired angular speed, ωc, outputting independent wheel speed commands to the wheels of the robot 300. A speed computation block 108 computes the robot's speed, $$\begin{bmatrix} v_x \\ v_y \end{bmatrix},$$

in a SE. An integrator block 110 is connected to the speed computation block 108 and computes the robot's position, $$\begin{bmatrix} x_s \\ y_s \end{bmatrix},$$

in a SE based on the robot's SE speed, $$\begin{bmatrix} v_x \\ v_y \end{bmatrix}.$$

A guidance command block 112 accepts as inputs the robot's environment, the target's position, and the robot's position, $$\begin{bmatrix} x_s \\ y_s \end{bmatrix},$$

the guidance command block 112 outputting guidance signals, Gx, Gy.

Feedback to the desired angular speed computation block 105 includes a dot product of the guidance signals Gx, Gy and the robot's speed, $$\begin{bmatrix} v_x \\ v_y \end{bmatrix},$$

a cross product of the guidance signals Gx, Gy and the robot's speed, $$\begin{bmatrix} v_x \\ v_y \end{bmatrix},$$

the magnitude of the robot's speed $$\left\| \begin{bmatrix} v_x \\ v_y \end{bmatrix} \right\|,$$

and the guidance signals, Gx, Gy. Feedback to the tangential speed computation block 102 includes a difference signal between the target position and the robot's position $$\begin{bmatrix} x_s \\ y_s \end{bmatrix}.$$

TABLE 9

Steps of the Generate Control Signal Stage

| GCS STEP | Function |
|---|---|
| 1 | $\eta_d = \dfrac{Gx \cdot vx + Gy \cdot vy}{\sqrt{vx^2 + vy^2}}, \eta_c = \dfrac{Gx \cdot vy - Gy \cdot vx}{\sqrt{vx^2 + vy^2}}$ |
| 2 | dst = $\sqrt{(Xs - XTs)^2 + (Ys - YTs)^2}$ |
| 3 | $vc = vd \cdot \begin{bmatrix} 1 & dst > Rc \\ \dfrac{dst}{Rc} & dst \leq Rc \end{bmatrix}, \omega c = \omega d \cdot \begin{bmatrix} \eta_c & \eta_d > 0 \\ +1 & \eta_c > 0 \text{ and } \eta_d < 0 \\ -1 & \eta_c < 0 \text{ and } \eta_d < 0 \end{bmatrix}$ |
| 4 | $\begin{bmatrix} \omega CR \\ \omega CL \end{bmatrix} = \dfrac{1}{r} \cdot \begin{bmatrix} 1 & \dfrac{W}{2} \\ 1 & -\dfrac{W}{2} \end{bmatrix} \begin{bmatrix} vc \\ \omega c \end{bmatrix}$ |

TABLE 10

Control Structure Steps (CONSS)

| CONSS STEP | Function |
|---|---|
| 1 | Initialize |
| 2 | Perform full field relaxation |
| 3 | Process robot feedback |
| 4 | Determine whether an obstacle is detected (Y/N) If Y goto step 5; If N goto step 7 |
| 5 | Record obstacle |
| 6 | Perform partial field relaxation |

TABLE 10-continued

Control Structure Steps (CONSS)

| CONSS STEP | Function |
|---|---|
| 7 | Get guidance signal |
| 8 | Update robot variables |
| 9 | Generate control signal |
| 10 | Control robot according to the control signal |
| 11 | Determine whether the robot stopped (Y/N) If N goto step 3; If Y goto step 12 |
| 12 | Determine whether the target has been reached (Y/N) If Y goto step 13; If N goto step 2 |
| 13 | STOP |

The full and partial field relaxation stages assure that a robot can reach a target zone from the first attempt without the need for map-building. Moreover, the control structure can reliably utilize even one ultrasonic sensor to extract the necessary and sufficient information needed to navigate the robot in an unknown and unstructured environment. The aforementioned processing stages of the present target-seeking control method are fully autonomous. In other words, no external intervention by an operator is needed starting from the sensory signal from which the robot acquires information about the environment and ending with the control signal that is fed to the robot's actuator of motion (wheels' control speed). The aforementioned processing stages overcome problems associated with actuator saturation, sensor noise and limited computational capabilities.

The present method still allows operator input of available partial knowledge about the environment in the robot's database in order to expedite task execution. The control signal developed by the present method and fed to the actuators of the robot is a well-behaved continuous control signal, in contrast with prior art techniques for controlling nonholonomic robots (such as the differential drive robot), which use discontinuous control signals. A well-behaved control signal reduces the energy drain and the probability of actuator failure.

Additionally, the present method provides good performance, even when a very simple dead-reckoning localization procedure is used (i.e., robot position extracted by counting the number of time robots wheels turn). The structure can decouple the computational demands during the execution (hard-time) from the size of the workspace and make it proportional at an instant of time to the amount of environmental components (obstacles) that are discovered.

Figure 7:
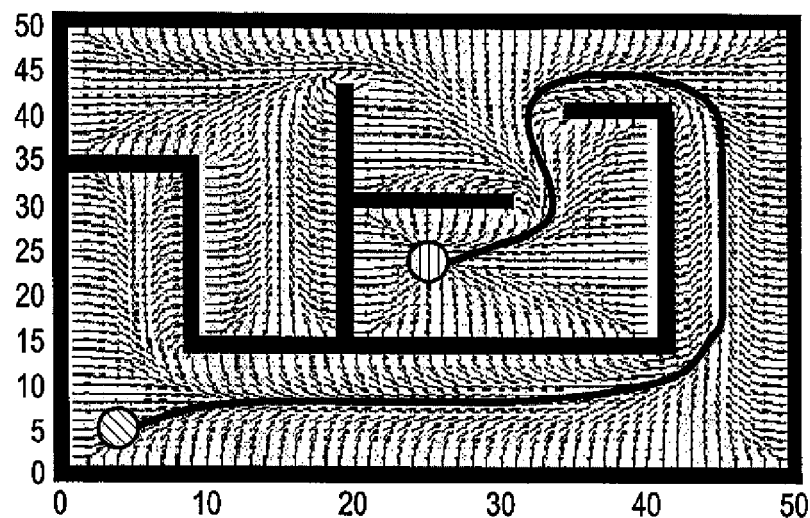
FIG. 7 is a plot showing an exemplary trajectory generation by the relaxation procedure in fully known environments in the target-seeking control method and system for mobile robots according to the present invention.
Figure 8:
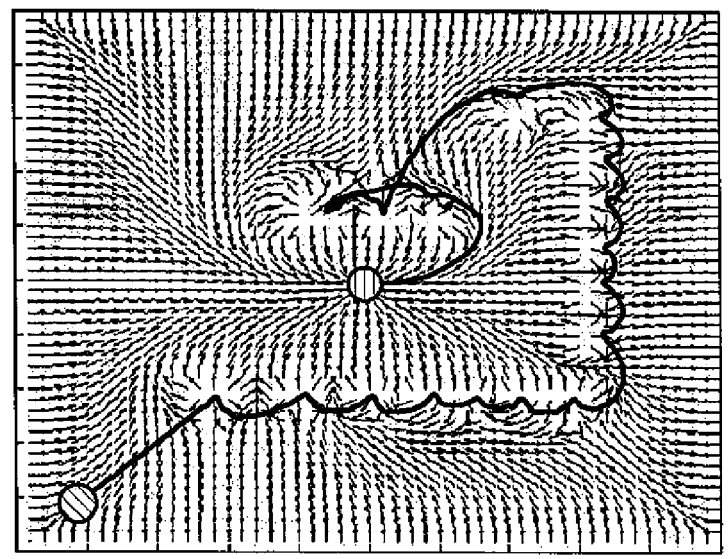
FIG. 8 is a plot showing an exemplary sensor-based trajectory generation by the relaxation procedure in the target-seeking control method and system for mobile robots according to the present invention.

Plot 700 of FIG. 7, shows the ability of the global relaxation procedure to mark a trajectory to the target when an environment is fully-known. Plot 800 of FIG. 8 demonstrates the ability of the relaxation procedure to generate a trajectory to the target while the obstacles are being acquired using highly localized sensing.

Figure 9A:
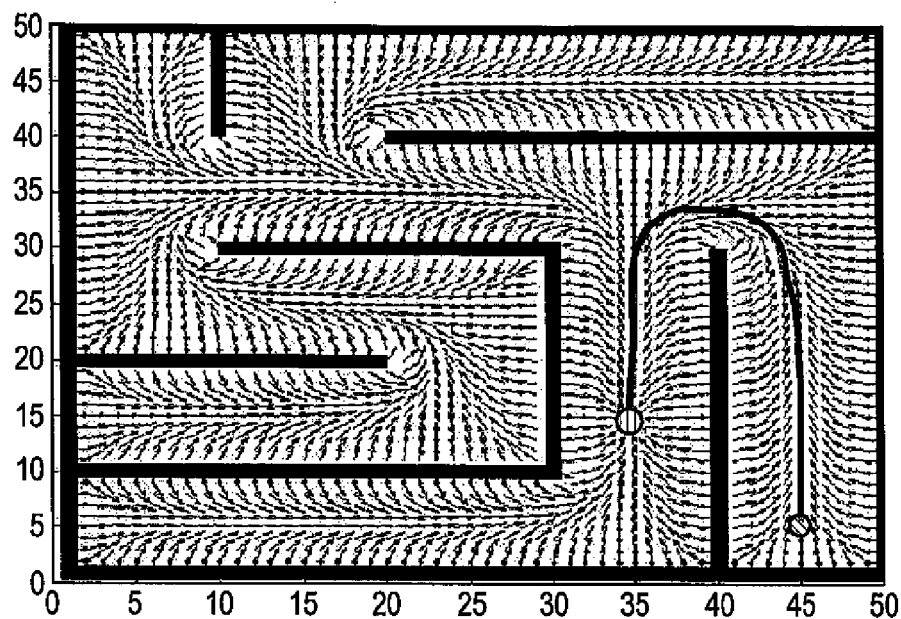
FIG. 9A is a plot showing an exemplary guidance signal in the target-seeking control method and system for mobile robots according to the present invention.
Figure 9B:
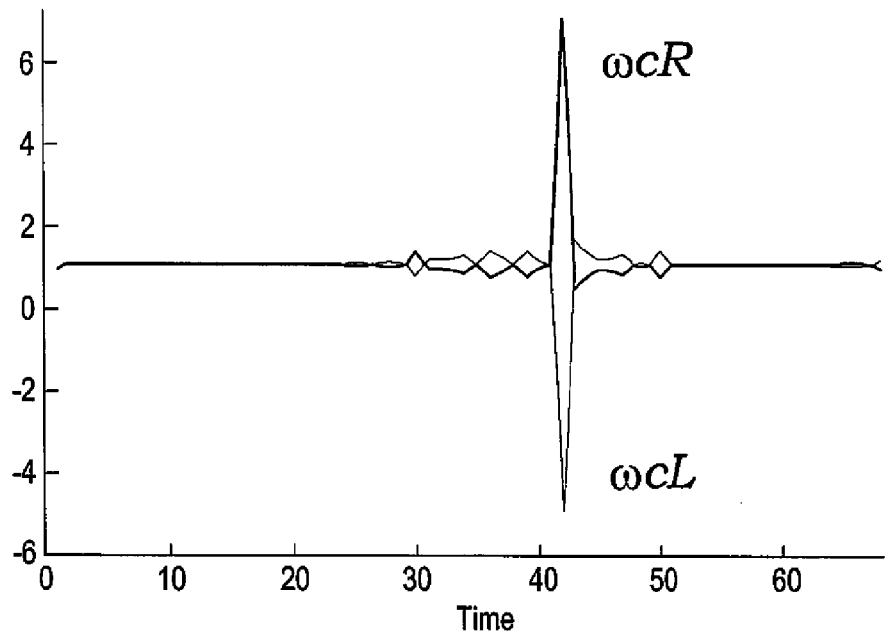
FIG. 9B is a plot showing the converted wheel speed control signals from the guidance signal of FIG. 9A in the target-seeking control method and system for mobile robots according to the present invention.

The ability of the "generate control signal" GCS stage 100*b* to convert the guidance signal to a control signal for the robot's wheels is shown in plot 900*b* of FIG. 9B. The guidance field generated from the relaxation stage for a fully-known environment is operated on by the control generating stage. The speeds of the wheels that generate the trajectory (shown in plot 900*a* of FIG. 9A) are well-behaved.

Figure 10A:
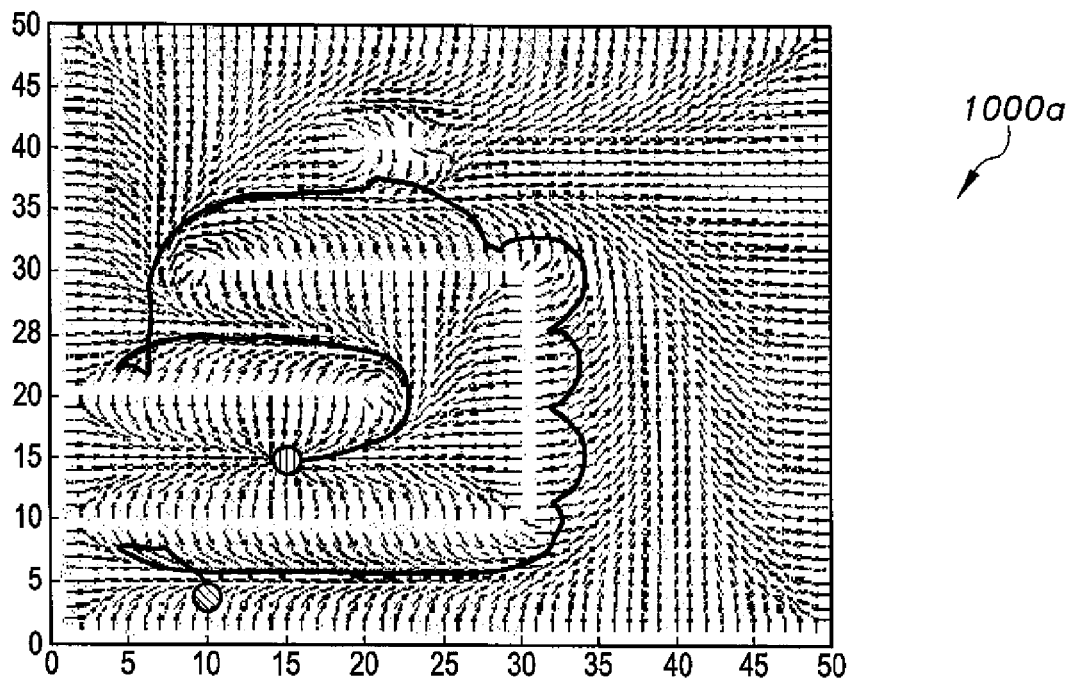
FIG. 10A is a plot showing exemplary guidance in the target-seeking control method and system for mobile robots according to the present invention.
Figure 10B:
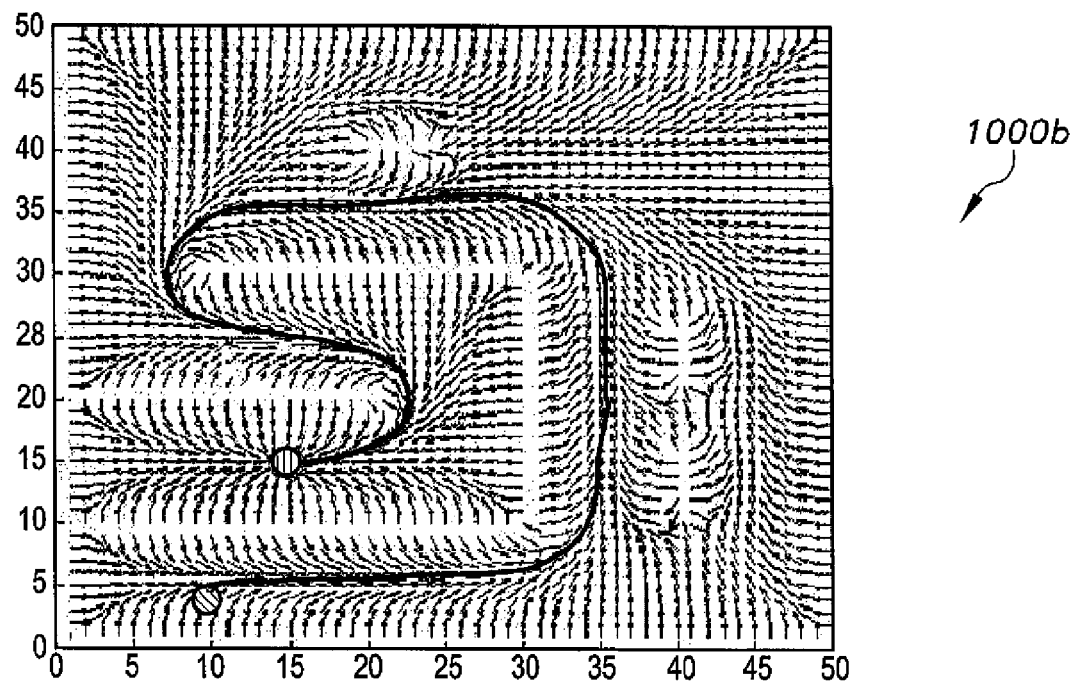
FIG. 10B is a plot showing exemplary control in the target-seeking control method and system for mobile robots according to the present invention.

The ability of the control generation stage to yield the needed control signals while the trajectory of the robot is being updated using the sensory feedback is shown in guidance plot 1000*a* of FIG. 10A and control plot 1000*b* of FIG. 10B. Guidance plot 1000*a* shows the path marked by a point holonomic robot that is exactly following the guidance signal (normalized gradient field of V), while the path illustrated in control plot 1000*b* shows the robot's path generated by converting the guidance signal into wheel speed control signals.

Figure 11B:
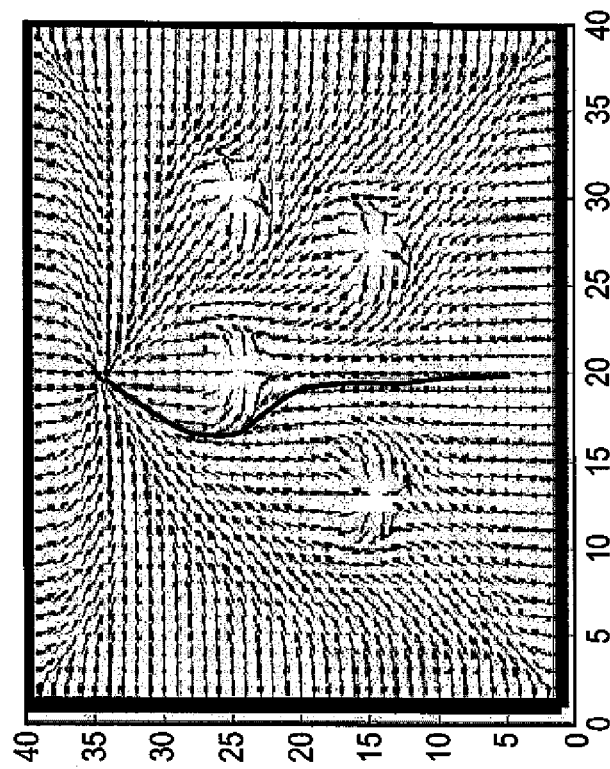
FIGS. 11A, 11B are exemplary plots showing obstacles to avoid and the resultant trajectory, respectively, in the target-seeking control method and system for mobile robots according to the present invention.
Figure 11A:
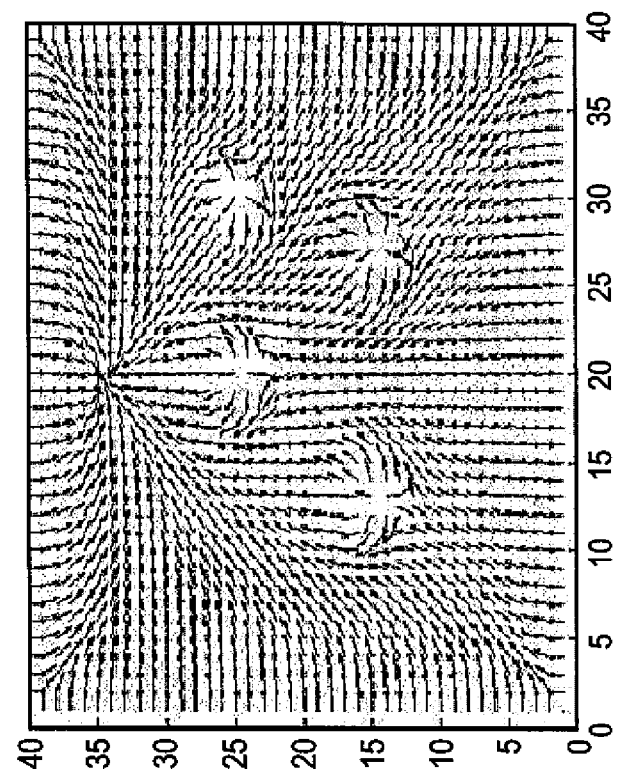
Figure 11D:
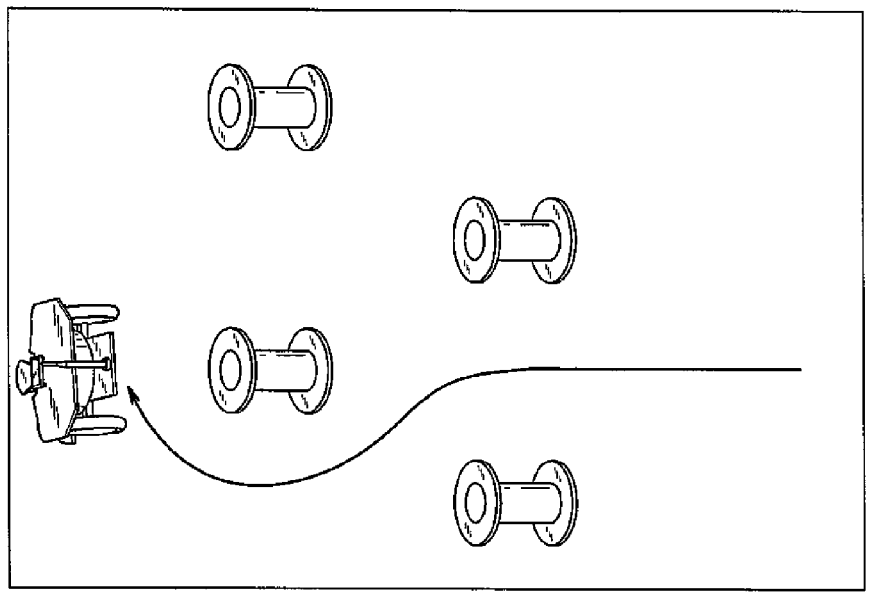
FIGS. 11C, 11D present video captures showing the mobile platform successfully avoiding the obstacles of FIGS. 11A, 11B in the target-seeking control method and system for mobile robots according to the present invention.
Figure 11C:
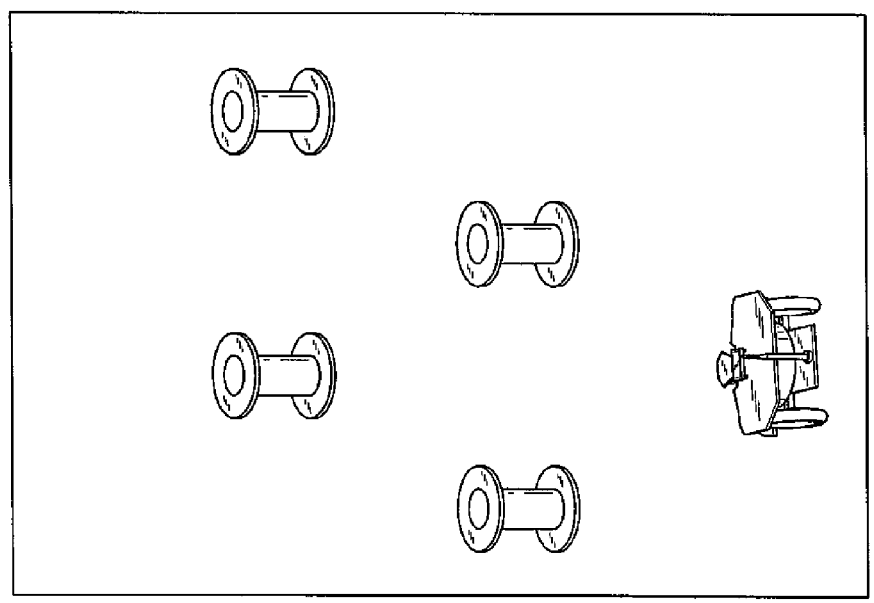

The ability of the control structure 100*a* to generate motion for the X80 robot 300 from full information about the location of the obstacles is demonstrated in FIGS. 11A, 11B where plot 1102*a* shows the environmental and object fields and plot 1102*b* shows the plotted trajectory around the object fields. FIGS. 11C, 11D show the robot 300 at the navigation start point 1104*a* and at the navigation end point 1104*b*.

Figure 12:
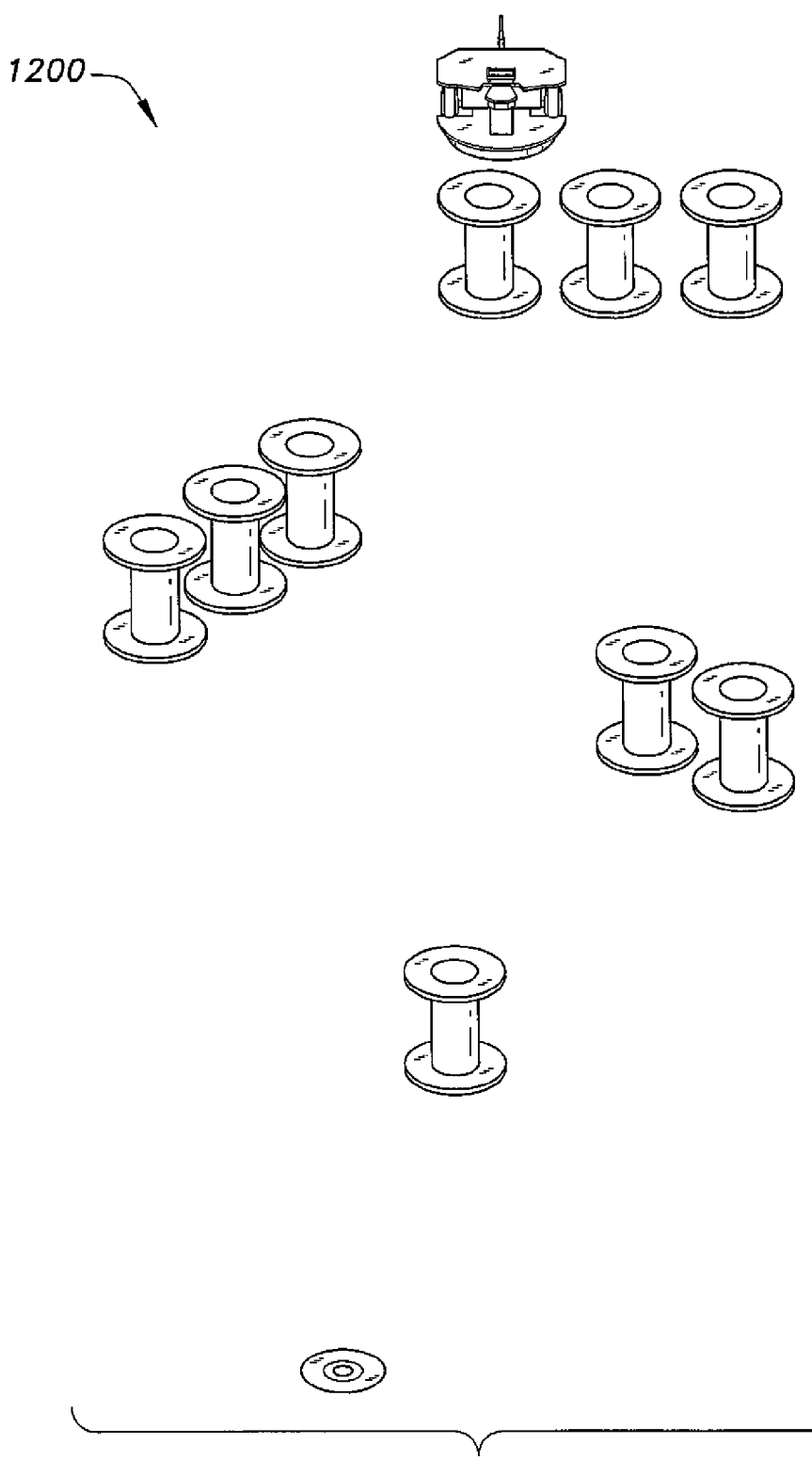
FIG. 12 is a perspective view showing the mobile platform at the beginning of an obstacle course in the target-seeking control method and system for mobile robots according to the present invention.
Figure 13:
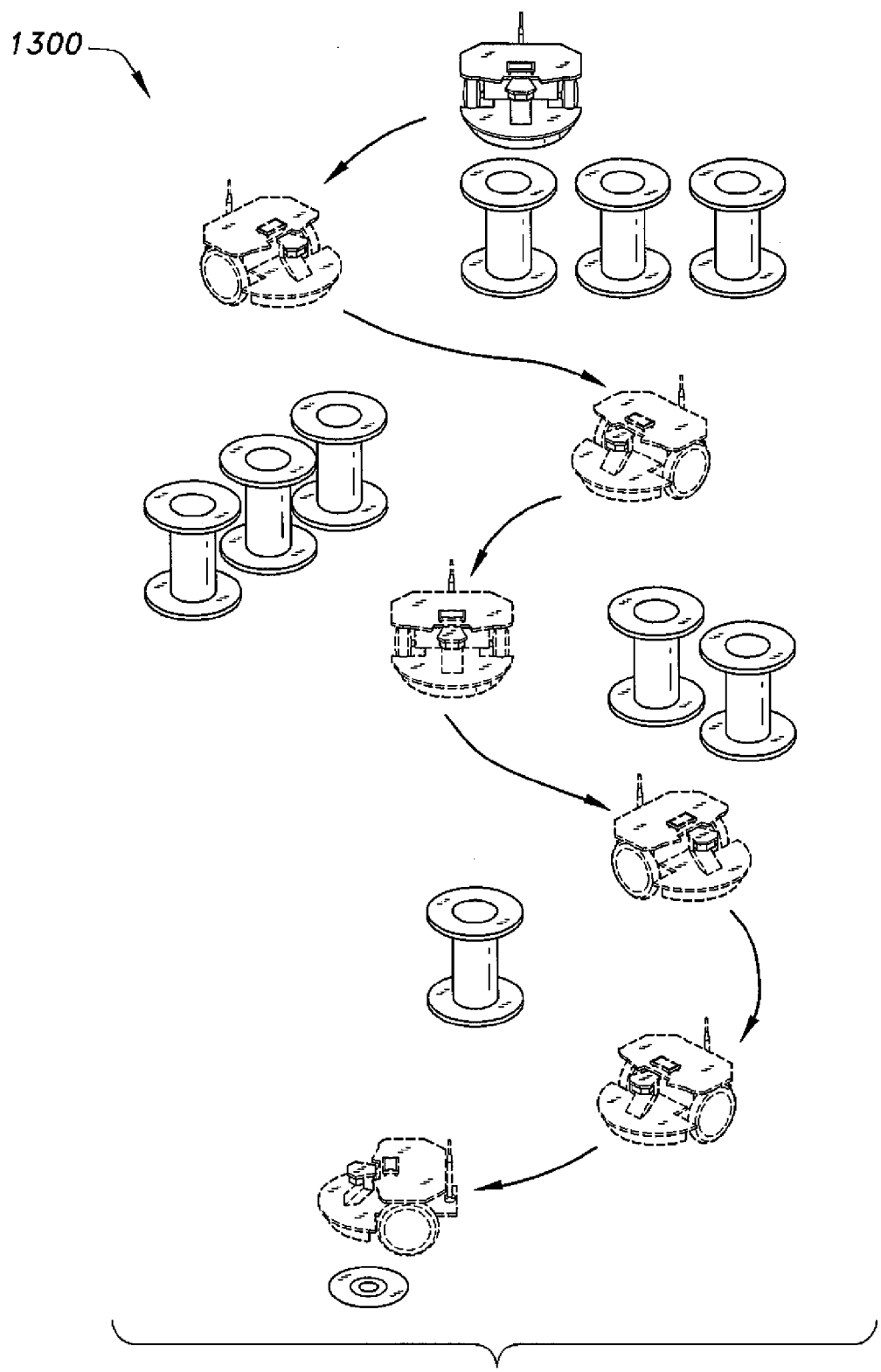
FIG. 13 is a perspective view showing successive positions of the mobile platform successfully navigating the obstacle course in the target-seeking control method and system for mobile robots according to the present invention.

The "not a priori known" start point and environment 1200 is shown in FIG. 12. The ability of the control structure 100*a* to move the X80 robot 300 to a target point under zero initial information about the environment, i.e., not a priori known, while using only one front ultrasonic sensor is shown in the course 1300 of FIG. 13.

Figure 14:
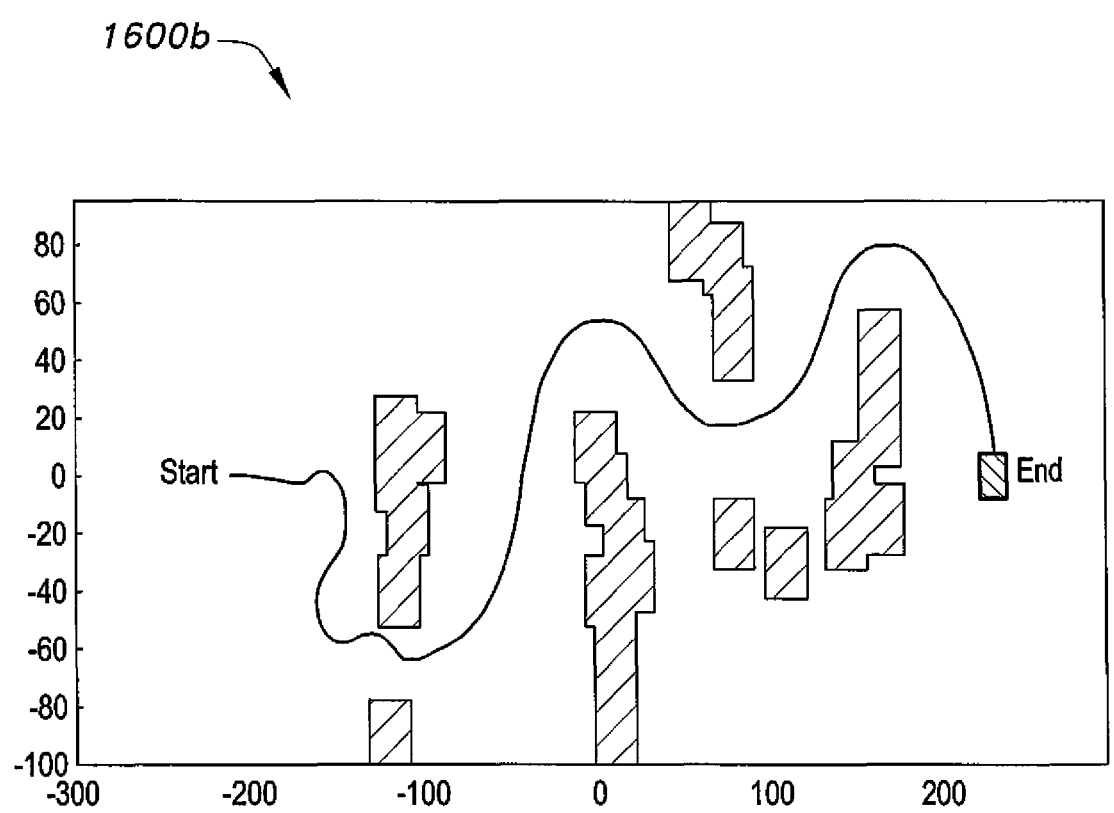
FIG. 14 is a plot showing an exemplary subjective map of the final environment in the target-seeking control method and system for mobile robots according to the present invention.
Figure 15:
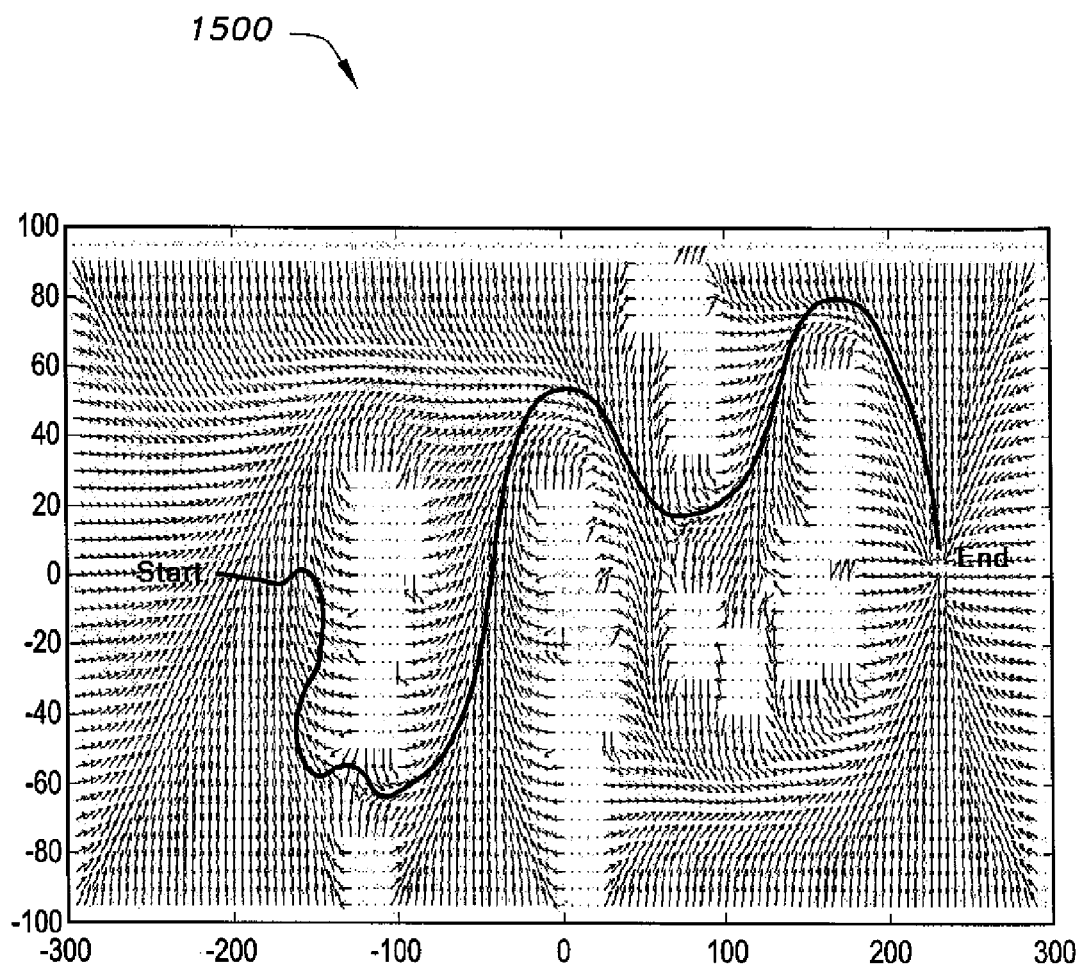
FIG. 15 is a plot showing an exemplary final guidance field corresponding to the final environment of FIG. 14 in the target-seeking control method and system for mobile robots according to the present invention.
Figure 16:
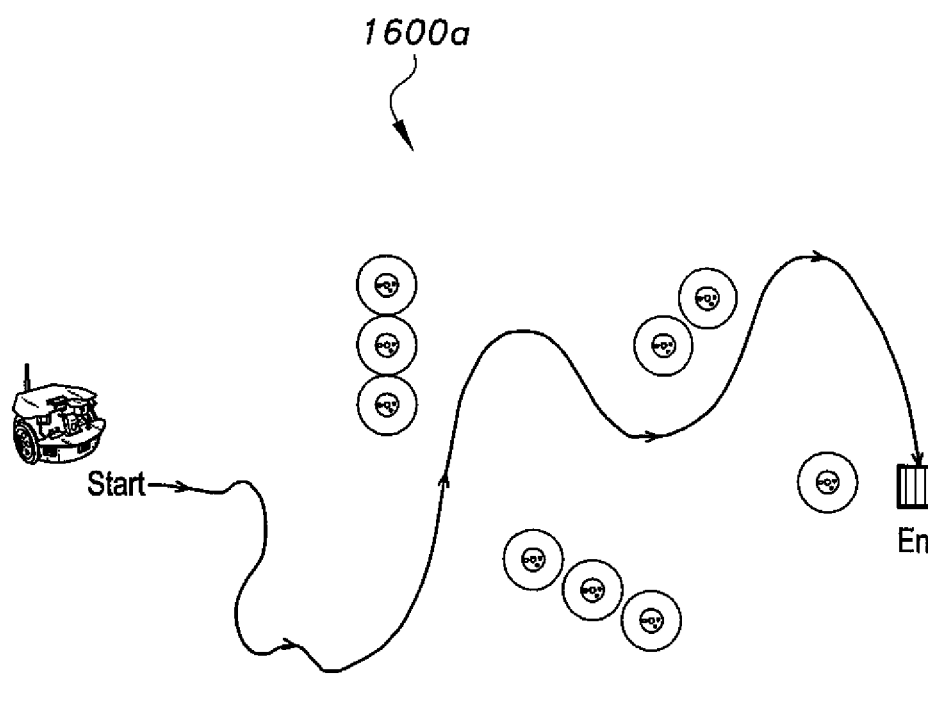
FIG. 16 is a diagram showing an exemplary objective map corresponding to the subjective map of FIG. 14 in the target-seeking control method and system for mobile robots according to the present invention.
Figure 17:
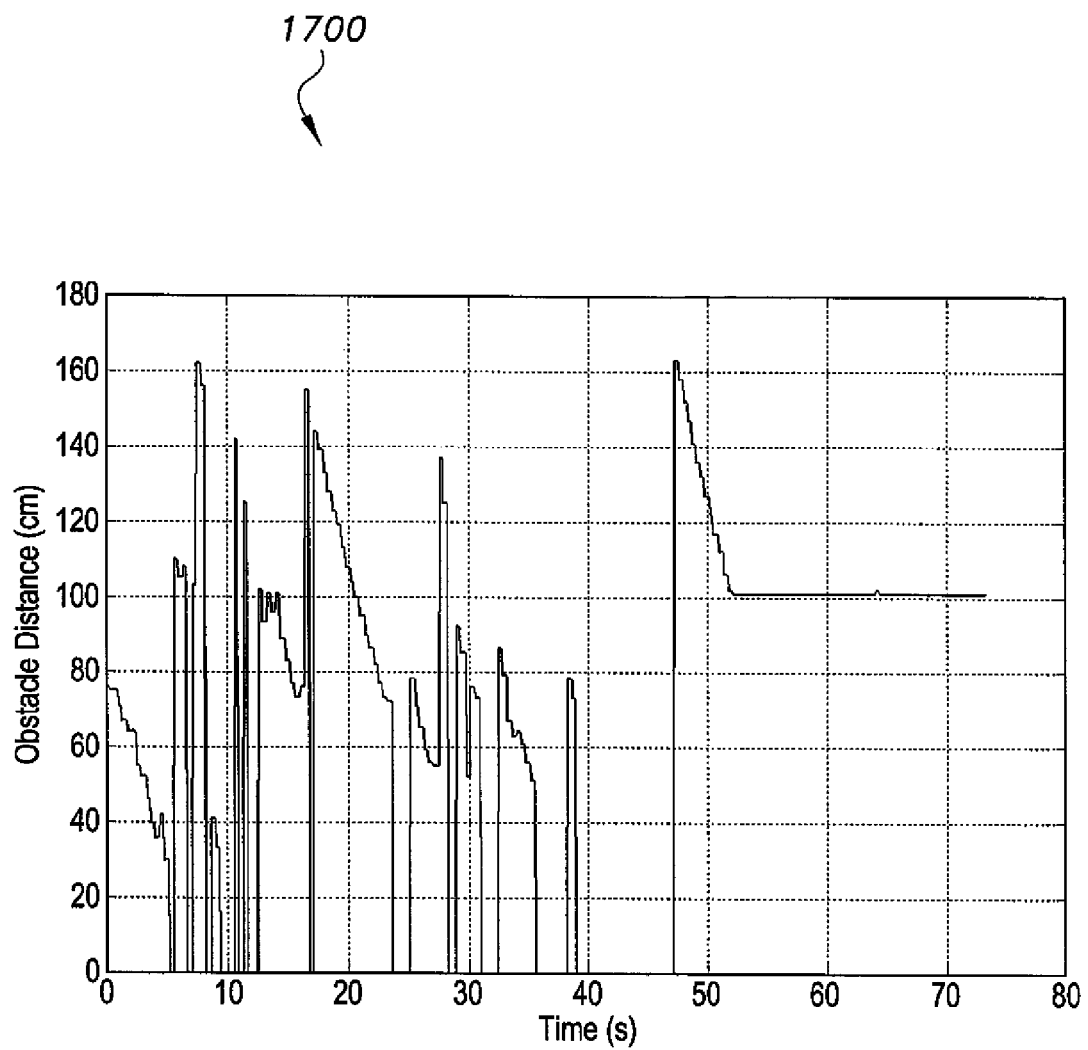
FIG. 17 is an exemplary plot showing signals from the mobile platform's ultrasonic sensor in the target-seeking control method and system for mobile robots according to the present invention.

Plot 1600*b* of FIG. 14 shows the final subjective environment created by accumulating the sensor data. The trajectory the robot took is superimposed on the environment map. Plot 1500 of FIG. 15 shows the corresponding final guidance field with the trajectory superimposed on it. As can be seen, although the robot's path was well-behaved and kept a good distance away from the obstacle, the recorded objective map 1600*a* shown in FIG. 16 significantly deviates from the subjective map 1600*b* of the environment shown in FIG. 14. The signal from the sensor used to build the SE map is shown in plot 1700 of FIG. 17.

It should be understood by one of ordinary skill in the art that embodiments of the present target-seeking control method and system for mobile robots including control structure 100*a* and/or the GCS system 100*b* can comprise software or firmware code executing on a computer, a microcontroller, a microprocessor, or a DSP processor; state machines implemented in application specific or programmable logic; or numerous other forms, and is in operable communication with a robot, such as computer system 303 communicating with robot 300 for signal exchange between the processor, robotic drive components, robotic navigation components, and robotic sensor components without departing from the spirit and scope of the present invention. Moreover, the computer could be designed to be on-board the robot 300. The present target-seeking control method for mobile robots can be provided as a computer program, which includes a non-transitory machine-readable medium having stored thereon instructions that can be used to program a computer (or other electronic devices) to perform a process according to the methods. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

It is to be understood that the present invention is not limited to the embodiments described above, but encompasses any and all embodiments within the scope of the following claims.

We claim:

1. A target-seeking control system for a mobile robot, the system comprising:
 the mobile robot; and
 at least one processor, the at least one processor comprising:

a tangential speed computation block having a tangential speed computation input, and outputting a tangential speed command, $v_c$;

a desired angular speed computation block having desired angular speed computation inputs and outputting a desired angular speed, $\omega_c$;

a wheel speed control block connected to the tangential speed computation block and the desired angular speed computation block, the wheel speed control block accepting as inputs the tangential speed command, $v_c$ and the desired angular speed, $\omega_c$ and outputting independent wheel speed commands to wheels of the robot;

a speed computation block computing the robot's speed, $$\begin{bmatrix} v_x \\ v_y \end{bmatrix},$$

in a subjective environment (SE);

an integrator block connected to the speed computation block and computing the robot's position, $$\begin{bmatrix} x_s \\ y_s \end{bmatrix},$$

in the SE based on the robot's speed, $$\begin{bmatrix} v_x \\ v_y \end{bmatrix};$$

a guidance command block accepting as inputs the robot's environment, a target's position, and the robot's position, $$\begin{bmatrix} x_s \\ y_s \end{bmatrix},$$

in the SE, the guidance command block outputting guidance signals, Gx, Gy;

wherein the at least one processor performs the steps of:
using the guidance signals Gx, Gy and the robot's speed, $$\begin{bmatrix} v_x \\ v_y \end{bmatrix},$$

to form signals that are applied to the desired angular speed computation inputs;
using the target position and robot's position, $$\begin{bmatrix} x_s \\ y_s \end{bmatrix},$$

in SE to form a signal applied to the tangential speed computation input;
initializing the robot, the robot's environment, and the target in the subjective environment (SE) that corresponds to a target in an objective environment (OE);
setting an iteration number for relaxation of a scalar potential field in the OE defined by operation of a sensor on the robot;
setting a discrete margin of safety about obstacles in the OE located by the sensor on the robot;
initializing a discrete representation of the SE;
initializing a representation of the scalar potential field corresponding to the discrete representation of the SE;
performing a full field relaxation of the scalar potential field based on the iteration number, whereby the strength of the scalar potential field is reduced, the discrete SE representation and the scalar potential field representation being updated accordingly; and
applying a stop signal to the robot when the robot has stopped due to the target being reached.

2. The target-seeking control system for a mobile robot according to claim 1, wherein the at least one processor further performs the steps of:
recording a detected obstacle; and
performing a partial field relaxation about the detected obstacle.

3. The target-seeking control system for a mobile robot according to claim 1, wherein the at least one processor further performs the step of:
performing the full field relaxation of the scalar potential field whenever the robot has stopped without reaching the target.

* * * * *